US009301235B2

(12) United States Patent
Hamilton (10) Patent No.: US 9,301,235 B2
(45) Date of Patent: Mar. 29, 2016

(54) METHOD, APPARATUS AND COMPUTER PROGRAM FOR CONTROLLING A COMMUNICATIONS STATE OF AN APPARATUS

(71) Applicant: Broadcom Corporation, Irvine, CA (US)

(72) Inventor: Christian Alexander Hamilton, Basingstoke (GB)

(73) Assignee: Broadcom Corporation, Irvine, CA (US)

( * ) Notice: Subject to any disclaimer, the term of this patent is extended or adjusted under 35 U.S.C. 154(b) by 210 days.

(21) Appl. No.: 14/045,018

(22) Filed: Oct. 3, 2013

(65) Prior Publication Data
US 2014/0092873 A1    Apr. 3, 2014

(30) Foreign Application Priority Data

Oct. 3, 2012  (GB) .................................. 1217707.7

(51) Int. Cl.
| | |
|---|---|
| *H04W 4/00* | (2009.01) |
| *H04W 36/30* | (2009.01) |
| *H04W 36/00* | (2009.01) |
| *H04W 36/24* | (2009.01) |
| *H04W 48/20* | (2009.01) |

(52) U.S. Cl.
CPC .......... *H04W 36/30* (2013.01); *H04W 36/0094* (2013.01); *H04W 36/245* (2013.01); *H04W 48/20* (2013.01)

(58) Field of Classification Search
CPC . H04W 36/30; H04W 36/0094; H04W 36/24; H04W 48/20
See application file for complete search history.

(56) References Cited

U.S. PATENT DOCUMENTS

| | | | |
|---|---|---|---|
| 7,006,821 B2 * | 2/2006 | Tee ................................ | 455/421 |
| 2004/0037249 A1 * | 2/2004 | Chae et al. ..................... | 370/332 |
| 2005/0239510 A1 * | 10/2005 | Cho ........................ | H04B 7/022 455/562.1 |
| 2006/0073830 A1 * | 4/2006 | Park et al. ....................... | 455/442 |
| 2008/0220784 A1 | 9/2008 | Somasundaram et al. | |
| 2009/0247161 A1 | 10/2009 | Pani et al. | |
| 2010/0297955 A1 * | 11/2010 | Marinier et al. ................ | 455/73 |
| 2012/0071167 A1 | 3/2012 | Bhandari | |

FOREIGN PATENT DOCUMENTS

| | | |
|---|---|---|
| AU | 2011203129 | 7/2011 |
| EP | 2187671 | 5/2010 |
| WO | WO2006096036 | 9/2006 |

* cited by examiner

*Primary Examiner* — Lonnie Sweet
(74) *Attorney, Agent, or Firm* — Oblon, McClelland, Maier & Neustadt, L.L.P.

(57) ABSTRACT

A method, apparatus and computer program are provided for controlling a communications state of an apparatus with respect to a serving cell in a communications network. The apparatus is configured with a first and second, different signal threshold, wherein the first and second signal thresholds are dependent on a reference signal. A value of a signal associated with at least one cell in the communications network is monitored. A timer is configured with a first operative state when the monitored signal value is determined to exceed the first signal threshold and a second operative state when the monitored signal value is determined to be lower than the second signal threshold. Responsive to a value of the timer satisfying a predetermined time parameter, the communications state of the apparatus with respect to its serving cell is adjusted.

19 Claims, 5 Drawing Sheets

METHOD, APPARATUS AND COMPUTER PROGRAM FOR CONTROLLING A COMMUNICATIONS STATE OF AN APPARATUS

CROSS REFERENCE TO RELATED APPLICATION

This application claims the benefit under 35 U.S.C. §119 (a) and 37 CFR §1.55 to UK patent application no. 1217707.7, filed on Oct. 3, 2012, the entire content of which is incorporated herein by reference.

TECHNICAL FIELD

Embodiments described in the present disclosure relate to a method, apparatus and computer program for controlling a communications state of an apparatus with respect to a serving cell in a communications network.

BACKGROUND

User equipment (UE), such as mobile phones, must be able to maintain a level of service with a communications network as they move in and around the communications network. In this regard, mobility techniques such as cell reselection (where the UE is either in the so-called radio resource connection (RRC) idle mode or in a "CELL_FACH" state in RRC semi-idle mode) can be used to maintain connectivity with the network.

In general, when the UE is camped on a cell, it regularly searches for a better cell according to cell reselection criteria. The cell reselection process enables the UE to "reselect" a neighbour cell as its new serving cell, where the neighbour cell has been determined to provide a better quality or stronger signal than the current serving cell. More particularly, the UE switches to a neighbour cell if the signal strength of that neighbour cell has been determined to be better than the signal strength of the current serving cell for at least as long as a "time to trigger" threshold time period specified by the network. A timer is therefore used to measure the amount of time that the neighbour cell signal strength remains above that of the serving cell signal strength. This timer is reset to zero when the neighbour cell signal strength drops below that of the serving cell. The timer is started again once the signal strength of the neighbour cell rises above the serving cell signal strength a second time.

In some situations, the signal strength of the current serving cell may drop and there may not be any neighbour cells available for cell reselection (i.e. either because no neighbour cells have been detected that are in proximity to the UE or because the signal strengths of the existing neighbour cells do not satisfy the cell reselection criteria). In this case, if the signal strength of the current serving cell drops below a minimum service level specified by the network then the UE determines that it is "out of service" and thus is unable to maintain communications with the network. The UE can then start a service recovery procedure in order to regain a level of service, for example, by initiating a public land mobile network (PLMN) search.

In such an out of service mechanism, the UE is determined to be out of service if the signal strength of the serving cell falls below the minimum service level for at least as long as an out of service threshold time period. This threshold time period is specified in 3GPP as 12 seconds for idle mode and 4 seconds for FACH mode. A timer is therefore used to trigger the start of the service recovery procedure. The UE must re-select to a suitable cell before the out of service time period expires. A suitable cell is deemed to be a cell which meets the network specified minimum service criteria. The timer is reset to zero when the serving cell signal strength rises above the minimum service level. The timer is started again once the serving cell signal strength falls below the minimum service level a second time. The timer expires if the signal level of the current serving cell stays below the minimum receive level for the out of service threshold time period.

Therefore, only measured signal strengths that are consistently either above or below a reference threshold signal level for a predetermined time period are taken into account in order to perform either a cell reselection or an out of service procedure.

The signals received by the user equipment may be affected by interference between the cells and from other transceiving (i.e. transmitting and/or receiving) sources and also the urban environment in which the UE is operating. This may give rise to spurious signal strength readings (i.e. an unexpected reading that does not follow the trend of the previous readings). For example, in cell reselection, such spurious signal strength readings can cause a timer to reset to zero when in fact the average of the neighbour cell signal strength readings are stronger than that of the service cell, and therefore the timer should not be reset. The resetting of the timer results in an unwanted delay for performing, for example, cell reselection.

A need therefore exists to overcome the aforementioned problems.

SUMMARY

According to an exemplary embodiment, there is provided a method, comprising: arranging for an apparatus to be configured with a first signal threshold and a second signal threshold, different from the first signal threshold, wherein the first signal threshold and the second signal threshold are dependent on a reference signal; monitoring a value of a signal associated with at least one cell in the communications network; configuring a timer with a first operative state when the monitored signal value is determined to exceed the first signal threshold; configuring the timer with a second operative state when the monitored signal value is determined to be lower than the second signal threshold; and responsive to a value of the timer satisfying a predetermined time parameter, adjusting the communications state of the apparatus with respect to its serving cell.

According to a further exemplary embodiment, there is provided a non-transitory computer-readable storage medium comprising a set of computer-readable instructions stored thereon, which, when executed by a processing system, cause the processing system to be configured with a first signal threshold and a second signal threshold, different from the first signal threshold, wherein the first signal threshold and the second signal threshold are dependent on a reference signal, in which the set of instructions, when executed by the processing system, further cause the processing system to perform the steps of: monitoring a value of a signal associated with at least one cell in the communications network; configuring a timer with a first operative state when the monitored signal value is determined to exceed the first signal threshold; configuring the timer with a second operative state when the monitored signal value is determined to be lower than the second signal threshold; and responsive to a value of the timer satisfying a predetermined time parameter, adjusting the communications state of the apparatus with respect to its serving cell.

According to yet a further exemplary embodiment, there is provided an apparatus comprising at least one processor; and at least one memory including computer program code, the at least one memory and the computer program code being configured to, with the at least one processor, cause the apparatus at least to: configure a first signal threshold and a second signal threshold, different from the first signal threshold, wherein the first signal threshold and the second signal threshold are dependent on a reference signal; monitor a value of a signal associated with at least one cell in the communications network; configure a timer with a first operative state when the monitored signal value is determined to exceed the first signal threshold; configure the timer with a second operative state when the monitored signal value is determined to be lower than the second signal threshold; and responsive to a value of the timer satisfying a predetermined time parameter, adjust the communications state of the apparatus with respect to its serving cell.

Further features and advantages will become apparent from the following description of preferred embodiments, given by way of example only, which is made with reference to the accompanying drawings.

DETAILED DESCRIPTION

In the following description of exemplary embodiments it should be noted that the term "apparatus" includes wireless devices and, in general, any device capable of connecting wirelessly to a network. This includes in particular mobile devices including mobile or cell phones (including so-called "smart phones"), personal digital assistants, pagers, tablet and laptop computers, content-consumption or generation devices (for music and/or video for example), data cards, USB dongles, etc., as well as fixed or more static devices, such as personal computers, game consoles and other generally static entertainment devices, various other domestic and non-domestic machines and devices, etc. The term "user equipment" or UE is often used to refer to wireless devices in general, and particularly mobile wireless devices.

Similarly, various passages in this specification make mention of the terms "network", "network control apparatus" and "base station". In this respect, it will be understood that the "network control apparatus" is the overall apparatus that provides for general management and control of the network and connected devices. Such apparatus may in practice be constituted by several discrete pieces of equipment. Moreover for convenience and by convention, the terms "network", "network control apparatus" and "base station" will often be used interchangeably, depending on the context.

Figure 1:
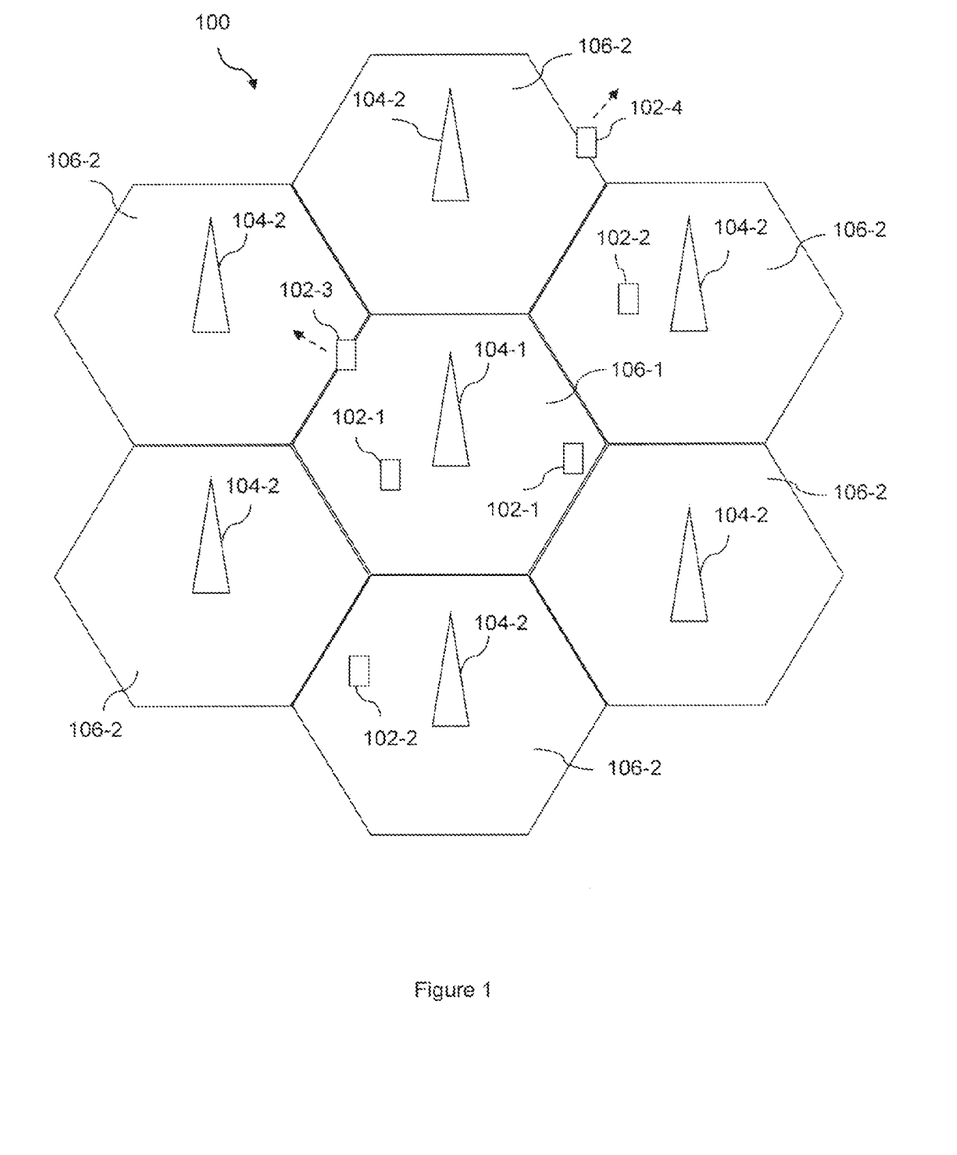
FIG. 1 shows a schematic block diagram of an example of system architecture according to an exemplary embodiment.

Embodiments are concerned with controlling a communications state of an apparatus with respect to a serving cell in a communications network. The apparatus is configured to operate within various types of networks, an example of such a network being shown in FIG. 1 of the accompanying drawings. FIG. 1 shows schematically a communications network 100 having a plurality of UEs 102, a plurality of base stations 104 and a plurality of cells 106 associated with each base station 104. Each of the plurality of cells 106 is defined as a geographical area within transmission range of the associated base station 104 for that cell. The cells are shown to have a hexagonal configuration for illustrative purposes only. From the perspective of the UEs 102-1 in the central hexagonal cell 106-1, the central hexagonal cell 106-1 is the "serving cell" (i.e. the cell that serves those UEs 102-1 within the cell 106-1) and the neighbouring cells 106-2 are known as "neighbour cells".

In FIG. 1, UE 102-3 is shown to be moving from its serving cell 106-1 to a neighbour cell 106-2 and is on the border between these cells. Typically, this will be an overlapping region between cells where the UE 102-3 can receive signals from both of the cells and must determine which cell it wishes to communicate with (usually the stronger cell) in a cell reselection procedure or handover procedure (depending on the operational state of the UE). UE 102-4 is shown to be moving between a serving cell 106-2 and a region where there is no network coverage by any of the base stations 104 and thus the UE 102-4 is out of a communications range governed by the network. Alternatively, this UE 102-4 may be in a region where, although there is possible network coverage, the UE 102-4 is unable to detect the network. In these situations, the UE 102-4 must determine if it should be declared out of service so that it can, for example, attempt a service recovery procedure.

Figure 2:
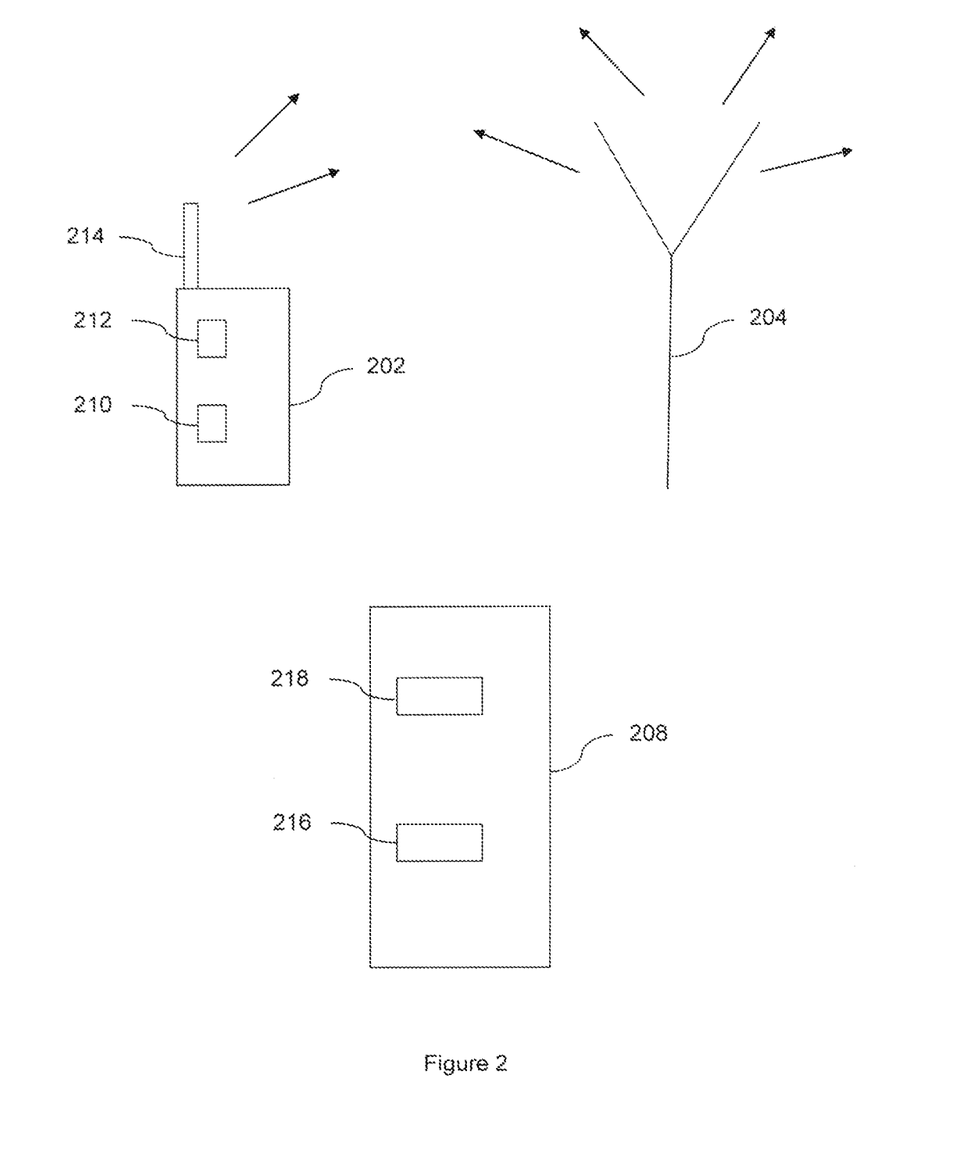
FIG. 2 shows a schematic block diagram of an example of the system architecture of FIG. 1 in further detail.

FIG. 2 shows schematically a UE 202, a base station 204 and a network control apparatus 208 for use in the communications network of FIG. 1.

The UE 202 contains the necessary radio module 210, processor(s) and memory/memories 212, antenna 214, etc. to enable wireless communication with the network. The UE 202 in use is in communication with a radio mast 204. As a particular example in the context of UMTS (Universal Mobile Telecommunications System), there may be a network control apparatus 208 (which may be constituted by for example a so-called Radio Network Controller) operating in conjunction with one or more Node Bs (which, in many respects, can be regarded as "base stations"). As another example, LTE (Long Term Evolution) makes use of a so-called evolved Node B (eNB) where the RF transceiver and resource management/control functions are combined into a single entity. The term "base station" is used in this specification to include a "traditional" base station, a Node B, an evolved Node B (eNB), or any other access point to a network, unless the context requires otherwise. The network control apparatus 208 (of whatever type) may have its own radio module 216, processor(s) and memory/memories 218, etc.

As is known to those skilled in the art, when a UE 102 is powered on, the UE 102 will typically search for a suitable cell 106 to camp on using a service discovery procedure such as cell selection and will tune to a control channel of a selected cell in order to receive system information from the network. More particularly, after powering on, a UE will first scan different radio frequencies in a Public Land Mobile Network (PLMN) search and record any PLMNs with which it can communicate. The UE will then see if any of these PLMNs match with one of a plurality of PLMNs stored in a Subscriber Identity Module (SIM) of the UE. If a match is found, the UE synchronises with the PLMN. Cell selection is then performed whereby the UE searches and camps on a suitable cell of the PLMN in order to receive system information broadcast by that cell. The system information typically includes configuration data such as a list of intra frequency and inter frequency neighbouring cells in a Neighbour Cell List (NCL), a minimum service level parameter (Ec/No and/or RSCP), priority information, maximum transmit power, hysteresis value (Qhyst), and a neighbour cell offset parameter.

After having found a suitable cell to camp on, the UE operates in a radio resource connection (RRC) idle mode. In general, a UE in RRC idle mode is in a low power state whereby it will receive paging messages from the network. The paging allows the UE to check with the network to see if any data is waiting to be sent to the UE or if the UE is being paged by the network to set up a voice or data call.

In order to maintain the best signal levels with a serving cell, the UE makes intermittent measurements of its environment to see whether or not a neighbour cell would be better suited as a serving cell. If such a neighbour cell is found, the UE can select this cell as its new serving cell. This well-known procedure is referred to as cell reselection and can occur when the UE is either in the RRC idle mode or in a CELL_FACH state in RRC semi-idle mode. In general, a UE in a CELL_FACH state is at a higher power level than when the UE is in RRC idle mode and can continuously monitor a FACH (forward access channel) in the downlink in order to receive data. The UE in CELL_FACH state can use a shared transport channel in the uplink for transmitting data.

If a UE determines that there are no suitable neighbour cells to select and the signal of the current serving cell has fallen below a minimum service level (as specified by the network), the UE will be unable to maintain communications with the network and will enter an "out of service" state. The UE will then typically begin a service recovery/discovery procedure such as a PLMN search in order to attempt to regain service.

Figure 3:
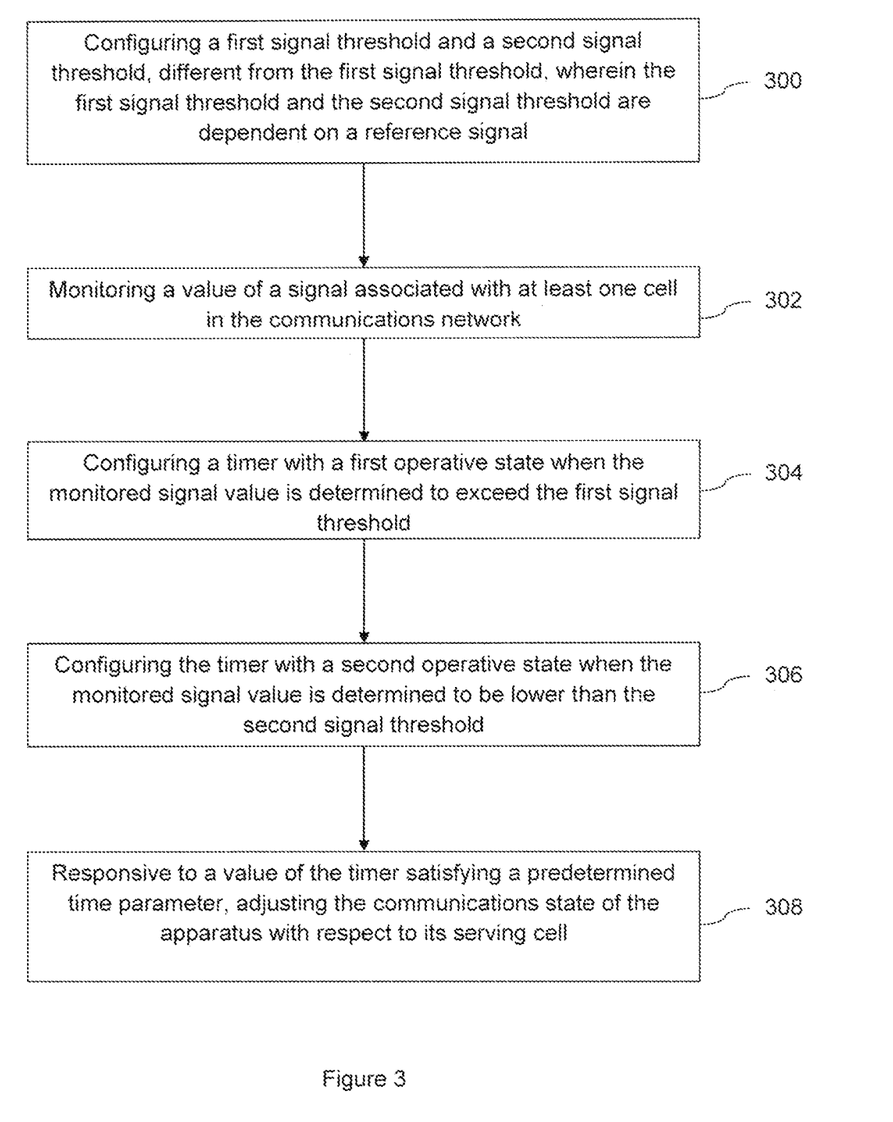
FIG. 3 shows a schematic state flow diagram of processes that occur in an example of a method according to an exemplary embodiment.

FIG. 3 shows a schematic state flow diagram of a method of enabling a UE to control its communication state with respect to its serving cell in the communications network, according to an example embodiment. For example, the communication state can be associated with a state of the UE in which the UE can determine whether or not a cell reselection procedure or an out of service procedure should be performed, as discussed further with respect to FIG. 4 and FIG. 5.

At step 300, the UE configures a first signal threshold and second, different signal threshold, based on a reference signal. Where the reference signal is a continuously changing signal, the calculation of these thresholds is periodic so that the thresholds are kept up-to-date. For example, in cell reselection, the reference signal is a periodic measurement of the UE's receive signal level strength. The reference signal used when determining an out of service state is defined by the network and typically has a constant value.

At step 302, the UE monitors a value of a signal associated with at least one cell in the communications network for comparison with the configured first and second thresholds. The result of the comparison is used to determine an operative state of a timer associated with the at least one cell. Such an operative state maybe defined as "active" or "inactive". An active operative state is where the timer is set to count (i.e. a continuous increment of the timer) and an inactive operative state is where the timer ceases counting and reinitialises its value to an equilibrium position (i.e. resets to zero). Whether the operative state of the timer is active or inactive is dependent on the process that is being determined by the UE as explained with reference to step 304 and 306.

The timer relating to the at least one cell is placed in a first operative state (i.e. either active or inactive) when the monitored signal value associated with the at least one cell is determined to exceed the first signal threshold (step 304). As above, the operative state is dependent on the process being executed by the UE. For example, in relation to a cell reselection process, when the monitored signal value exceeds the first signal threshold, the timer is placed in an active state. In relation to an out-of-service procedure, when the monitored signal value exceeds the first signal threshold, the timer is placed in an inactive state.

The timer is placed in a second operative state, different from the first operative state, when the monitored signal value is determined to be lower than the second signal threshold (step 306). For example, with respect to cell reselection, when the monitored signal value falls below the second signal threshold, the timer is placed in an inactive state. With respect to the out-of-service procedure, when the monitored signal value falls below the second signal threshold, the timer is placed in an active state.

At step 308, if a value of the timer satisfies (i.e. is equal to or greater than) a predetermined time parameter, the UE adjusts its communications state with respect to its serving cell. For example, in a cell reselection procedure, the UE will select the neighbour cell whose monitored signal value has been determined to exceed the first signal threshold for a period of time greater than the predetermined time parameter as a suitable candidate for cell reselection. In an out-of-service procedure, the UE will cease communications with the network if the serving cell monitored signal value is lower than the second signal threshold for a period of time greater than the predetermined time parameter.

As a first signal threshold and a second, different signal threshold are used to control the operative state of the timer rather than, for example, a single signal threshold, the likelihood of a spurious signal reading changing the operative state of the timer (and thereby activating or deactivating the timer), after having been set, is minimised. In turn, this reduces the possibility of a spurious signal reading from delaying the adjustment of the communications state of the apparatus with respect to its serving cell. This is because the first and second signal thresholds are spaced to allow such a spurious signal reading that falls between these signal thresholds to be accounted for such that if one of the signal thresholds is crossed (i.e. either exceeded by the monitored signal value or the monitored value falls below the signal threshold), the operative state of the timer cannot be changed until the other signal threshold is crossed. The spacing between the signal thresholds effectively provides for a hysteresis of signal readings to be used such that, if the mode of signal readings is indicative that the communications state of the apparatus should be adjusted, then the adjustment may be performed. Any spurious reading that temporarily suggests that the communications state should not be adjusted is discounted, as long as the signal reading does not change the operative state of the timer after the operative state has been set.

Exemplary embodiments shall now be described with reference to the UE in either RRC idle mode or the UE in a CELL_FACH state in RRC semi-idle mode.

As defined in 3GPP TS25.304, the UE receives a number of parameters from a network entity in system information blocks (SIBs) 4, 11 and 19. In particular, the UE receives at least a Neighbour Cell List (NCL), a hysteresis parameter (Qhyst), a cell reselection time parameter or time to trigger threshold (Treselection), a minimum cell quality level parameter (Qqualmin) and a minimum receive level parameter (Qrxlevmin).

The NCL comprises a list of cells that neighbour the UE, which neighbour cells can be used in the cell reselection. The hysteresis parameter is a parameter defined in TS25.304 for use in a cell ranking process and is applied to measurement results of neighbour cells once they have been determined to be suitable candidates for cell reselection. The time to trigger threshold is a time interval that indicates for how long a signal quality of a neighbour cell needs to be better than a signal quality threshold for it to be considered as a suitable candidate for cell reselection. The minimum cell quality level parameter specifies the minimum required quality level in the cell. The minimum receive level parameter specifies the minimum required reception level in the cell.

The UE periodically makes signal strength measurements of its serving cell (Qmeas,s) and also its neighbour cells (Qmeas,n). For a frequency division duplex (FDD) cell, a primary common pilot channel (PCPICH) is measured and the measurement quantity used is either a received signal code power (RSCP) or Ec/No. For a time division duplex (TDD) cell, the primary common control physical channel (PCCPCH) is measured and the measurement quantity is RSCP. Ec/No is the received energy per chip (Ec) of the PCPICH divided by the total noise of the power density (No).

The signal strength measurements (hereinafter "measurement results") are determined on a periodic basis with a time interval that is smaller than the time to trigger threshold. More particularly, the signal measurements of both the serving cell and the neighbour cells are made during a discontinuous reception (DRX) "on" period of the UE (which is, in general, a low power state where the UE intermittently makes measurements and checks for paging messages to be received from the network). The measurement results of both the serving cell and the plurality of neighbour cells in the NCL are stored at the UE and are periodically maintained.

Figure 4:
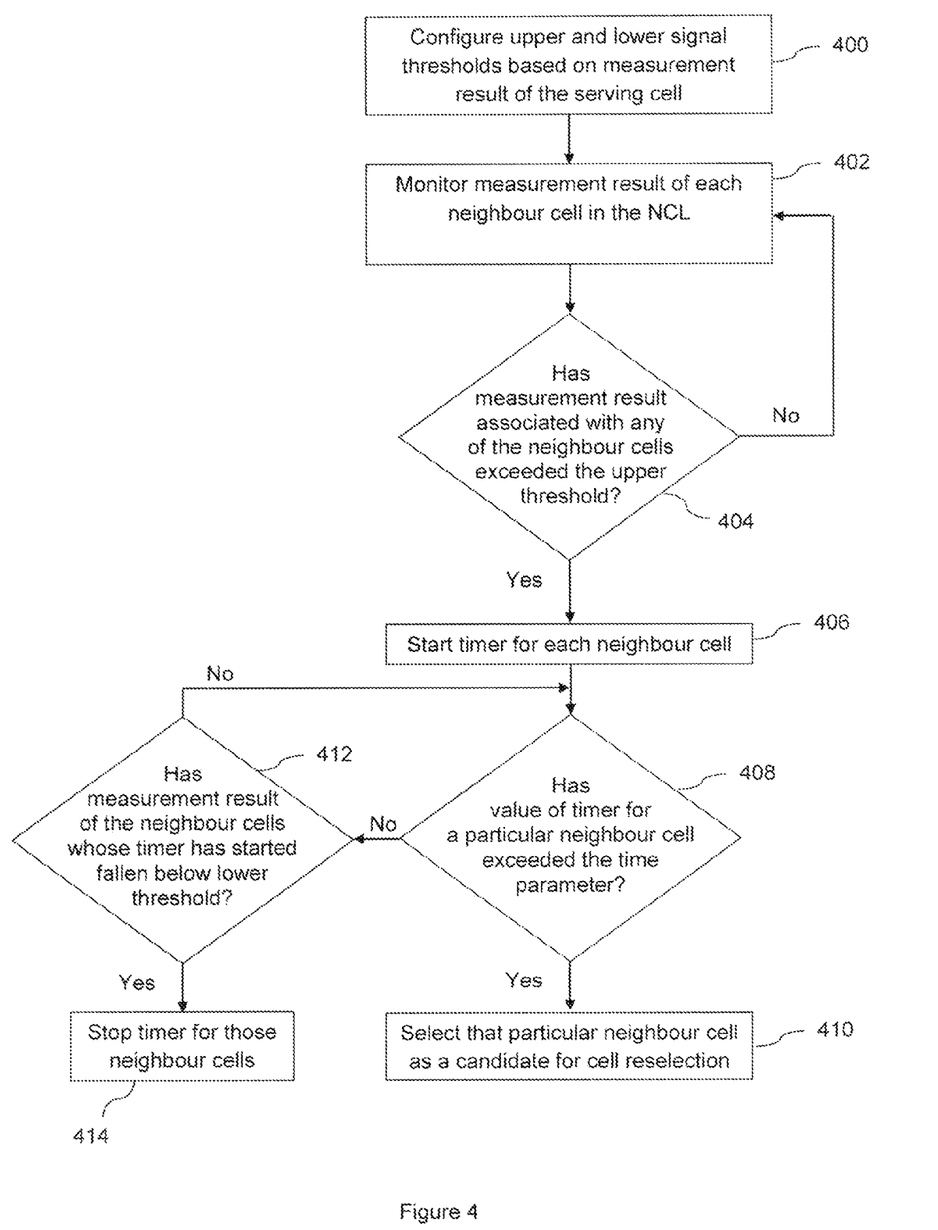
FIG. 4 shows a schematic state flow diagram of processes that occur in a second example of a method according to an exemplary embodiment.

FIG. 4 shows a schematic flow diagram of some of the processes that occur at the UE in order to select a neighbour cell as a suitable candidate for a cell reselection procedure. A UE in either the RRC idle mode or in the CELL_FACH state can perform a cell reselection to enable the UE to switch from its current serving cell to a new serving cell that has stronger signals than the current serving cell.

At step 400, the UE configures a first signal threshold (an "upper signal threshold") based on the measurement result of the serving cell. The upper signal threshold (CR_T1) is configured by adding a first predetermined parameter (H1) to the measurement result of the serving cell (Qmeas,s), as shown by equation (1) below. This is done periodically for each new measurement result of the serving cell.

$$CR\_T1 = Qmeas, s + H1 \quad (1)$$

The UE also configures a second signal threshold (a "lower signal threshold") based on the measurement result of the serving cell. The lower signal threshold (CR_T2) is configured by subtracting a second predetermined threshold (H2) from the measurement result of the serving cell (Qmeas,s), as shown by equation (2) below. This is done periodically for each new measurement result of the serving cell.

$$CR\_T2 = Qmeas, s - H2 \quad (2)$$

At step 402, the UE periodically monitors measurement results determined for each neighbour cell (Qmeas,n) listed in the NCL.

The UE periodically compares the monitored measurement results for each neighbour cell (n) with the upper signal threshold to see if any of the measurement results have exceeded the upper signal threshold (step 404). If a measurement result for a neighbour cell is determined to have exceeded the upper signal threshold, a timer (T(n)) associated with that neighbour cell is set so that it begins counting (step 406) as shown by conditional statement (3) below. If it is determined that none of the neighbour cell measurement results satisfy this criterion (i.e. exceeding the upper signal threshold), then the process goes back to step 404 where the neighbour cell measurement results continue to be monitored by the UE.

$$\text{If } Qmeas, n > CR\_T1, \text{ then start timer } T(n) \quad (3)$$

At step 408, after at least one timer associated with a neighbour cell (n) has been started, a value of that timer (T_VALUE(n)) is compared with a predetermined time parameter such as the time-to-trigger parameter (TTT) received from the network. If the timer value is equal to or greater than the time-to-trigger parameter, the neighbour cell associated with that timer is selected as a suitable candidate for cell reselection as shown by conditional statement (4) below. Thereby, a number of different neighbour cells having timer values that satisfy the time to trigger threshold are selected as candidates for use in the cell reselection process.

$$\text{If } T\_VALUE(n) > TTT, \text{ then select } n \text{ as suitable candidate for cell reselection} \quad (4)$$

If at step 408 it is determined that the time-to-trigger parameter has not been satisfied, the process moves onto step 412. It is noted that a separate timer can be used for each neighbour cell listed in the NCL.

At step 412, after having determined at step 408 that the time-to-trigger parameter has not been satisfied, the UE compares the neighbour cell measurement result with the lower signal threshold. If it has been determined that the neighbour cell measurement result has fallen below the lower signal threshold then the associated timer for that neighbour cell is stopped and reset to zero as shown by conditional statement (5) below. If the neighbour cell measurement result has not fallen below the lower signal threshold then the timer for that neighbour cell continues counting and the process goes back to step 408.

$$\text{If } Qmeas, n < CR\_T2, \text{ then stop timer } T(n) \quad (5)$$

Once one or more neighbour cells have been selected as suitable candidates for cell reselection, these selected suitable candidates can be ranked so that the UE can determine the best neighbour cell for the cell reselection. The UE can then make the cell reselection to the determined best neighbour cell. Using the differing thresholds to configure the timer reduces the likelihood of a spurious signal resetting the timer and delaying the UE from making a cell reselection to a better cell.

Figure 5:
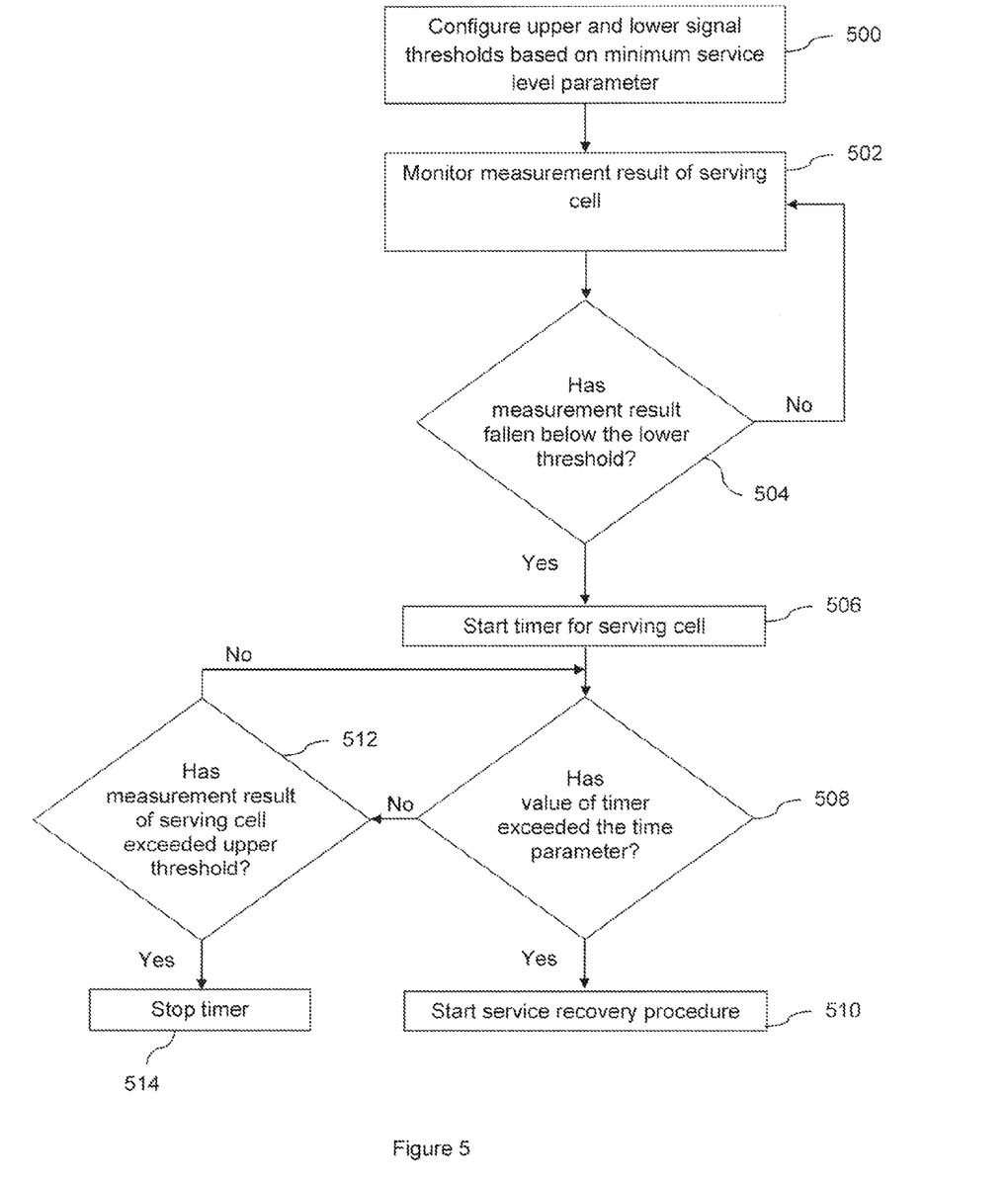
FIG. 5 shows a schematic state flow diagram of processes that occur in a third example of a method according to an exemplary embodiment.

A second exemplary embodiment is shown in FIG. 5, in which the UE determines, based on measurement results of the serving cell, whether or not the UE should go out of service, thereby ceasing camping on a cell and initiating a service recovery/discovery procedure (e.g. PLMN and cell selection).

In step 500, the UE configures a first signal threshold (the upper signal threshold) based on the minimum service level parameter received from the network. More particularly, the upper signal threshold (OOS_T1) is calculated by adding a first predetermined parameter (H3) to the minimum service level parameter (either Qqualmin (Ec/No) or Qrxlevmin (RSCP)) as shown by equation (6) below. This is performed whenever the minimum service level parameter is received from the network and every time a new minimum service level parameter is received from the network.

$$OOS\_T1 = Qrxlevmin + H3 \quad (6)$$

The UE also configures a second signal threshold (the lower signal threshold, OOS_T2) based on the minimum service level parameter received from the network. This is done by subtracting a second predetermined parameter (H4) from the minimum service level parameter as governed by equation (7) below. This is performed whenever the minimum service level parameter is received from the network and every time a new minimum service level parameter is received from the network.

$$OOS\_T2 = Qrxlevmin - H4 \tag{7}$$

As above, the UE intermittently determines signal strength measurements of its serving cell. At step 502, the UE monitors these serving cell measurements.

At step 504, the UE compares the serving cell measurement with the lower threshold. If the serving cell measurement result is determined to be below that of the lower signal threshold, a timer (T(s)) associated with the serving cell is started (step 506) as shown in conditional statement (8) below. If the serving cell measurement result is determined not to have fallen below the lower signal threshold, the process returns to step 502 where the serving cell measurement results continue to be monitored.

$$\text{If } Q\text{meas},s < OOS\_T2, \text{ then start timer } T(s) \tag{8}$$

After the timer associated with the serving cell has been started, a value of the timer (T_VALUE(s)) is periodically compared with a predetermined time parameter such as an out-of-service time parameter (OOS) (step 508). If the timer value has been determined to exceed the out-of-service time parameter, the UE ceases communications with the network and begins a service recovery procedure (e.g. PLMN search) as shown in conditional statement (9) below (step 510). If the value of the timer has been determined not to satisfy the out-of-service time parameter, the process moves onto step 512.

$$\text{If } T\_VALUE(s) > OOS, \text{ then start service recovery procedure} \tag{9}$$

At step 512, the serving cell measurement result is compared with the upper signal threshold. If the serving cell measurement result is determined to exceed the upper signal threshold then the timer associated with the serving cell is stopped and reset to zero, as shown by conditional statement (10) below. If, however, the serving cell measurement result does not exceed the upper signal threshold then the process returns to step 508.

$$\text{If } Q\text{meas},s > OOS\_T1, \text{ then stop timer } T(s) \tag{10}$$

If a UE has determined that it must go out of service and subsequently ceases communications with the network, the UE can then start a service recovery procedure. This service recovery typically uses a broad frequency search for suitable cells to camp on and is therefore not restricted to the neighbour cells listed in the NCL. It can therefore be advantageous for the UE to go out of service rather than remain on a weak cell so that the UE can find a better cell. Using the differing thresholds to configure the timer therefore reduces the likelihood of a spurious signal resetting the timer and delaying the UE from going out of service.

The above embodiments are to be understood as illustrative examples. Further embodiments of the invention are envisaged. For example, while in the above embodiments the parameters H1, H2, H3 and H4 are values stored at the UE, in alternative embodiments these parameters are specified by the network and can be sent in system information.

In the above embodiments, different parameters H1, H2, H3 and H4 were used. In alternative embodiments, these values may be these same or can be derived from another parameter. For example, the network-specified parameter Qhyst can be used to define these parameters. In particular, the value of each of these parameters can be equal to half of Qhyst such that the Qhyst parameter is centred around the reference signal.

In the above embodiments, either Qqualmin or Qrxlevmin was used in the out of service determination. In alternative embodiments, both Qqualmin and Qrxlevmin are used to determine when the UE is out of service. The UE will enter out of service if the signal level falls below Qqualmin or Qrxlevmin.

For example, in the case of cell reselection, a timer (T(n)) for a neighbour cell may be started when the following condition is met:

$$Q\text{meas},n > Q\text{meas},s + Qhyst/2$$

The timer (T(n)) may be stopped for that neighbour cell when the following condition is met:

$$Q\text{meas},n < Q\text{meas},s - Qhyst/2$$

In the case of out of service procedures, the timer (T(s)) for the serving cell may be started when the following condition is met:

$$Q\text{meas},s < Qrxlevmin - Qhyst/2$$

The timer may be stopped when the following conditions are met:

$$Q\text{meas},s > Qrxlevmin + Qhyst/2$$

Although at least some aspects of the embodiments described herein with reference to the drawings comprise computer processes performed in processing systems or processors, embodiments include computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes described herein. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

It is to be understood that any feature described in relation to any one embodiment may be used alone, or in combination with other features described, and may also be used in combination with one or more features of any other of the embodiments, or any combination of any other of the embodiments.

Furthermore, equivalents and modifications not described above may also be employed without departing from the scope of the present disclosure.

What is claimed is:

1. A method, implemented by an apparatus comprising:
configuring, by circuitry of the apparatus, a first signal threshold and a second signal threshold, different from the first signal threshold, wherein the first signal threshold and the second signal threshold are calculated based on a reference signal;
monitoring, by the circuitry, a value of a signal transmitted from a base station in at least one cell in the communications network;
configuring, by the circuitry, a timer to be active, wherein the timer proceeds with counting, when the monitored signal value is determined to exceed the first signal threshold when the apparatus is determining whether or not to perform a cell reselection procedure;
configuring, by the circuitry, the timer to be inactive, wherein the timer ceases counting, when the monitored signal value is determined to exceed the first signal threshold when the apparatus is determining whether or not to perform an out-of-service procedure;
configuring, by the circuitry, the timer to be inactive when the monitored signal value is determined to be lower than the second signal threshold when the apparatus is determining whether or not to perform the cell reselection procedure;
configuring, by the circuitry, the timer to be active when the monitored signal value is determined to be lower than the second signal threshold when the apparatus is determining whether or not to perform the out-of-service procedure; and
responsive to a value of the timer satisfying a predetermined time parameter, adjusting, by the circuitry, a communications state of the apparatus with respect to its serving cell.

2. A method as claimed in claim 1, wherein adjustment of the communications state of the apparatus is controlled independent of signalling from the communications network.

3. A method as claimed in claim 1, wherein the communications state is associated with either a radio resource control (RRC) idle mode or in a state in which no dedicated physical channel is allocated to the apparatus.

4. A method as claimed in claim 1, wherein the first signal threshold is configured by adding a first predetermined parameter to a value of the reference signal and the second signal threshold is configured by subtracting a second predetermined parameter from the value of the reference signal.

5. A method as claimed in claim 4, wherein the reference signal value is one of:
a ratio between a received energy per chip (Ec) of a common pilot channel (CPICH) associated with the serving cell divided by the total noise of the power density (No) of the CPICH associated with the serving cell; and
received signal code power (RSCP) of the common pilot channel (CPICH) associated with the serving cell.

6. A method as claimed in claim 1, wherein the at least one cell is a neighbour cell associated with the serving cell.

7. A method as claimed in claim 6, wherein the monitored signal value is one of:
a ratio between a received energy per chip (Ec) of a common pilot channel (CPICH) associated with the at least one cell divided by the total noise of the power density (No) of the CPICH associated with the neighbour cell; and
received signal code power (RSCP) of the common pilot channel (CPICH) associated with the neighbour cell.

8. A method as claimed in claim 1, wherein the inactive state is used to initialise the timer to an equilibrium value after the counting has ceased.

9. A method as claimed in claim 1, wherein adjusting the communications state of the apparatus with respect to its serving cell comprises selecting the at least one cell as a suitable candidate for cell reselection.

10. A method as claimed in claim 1, wherein the reference signal is a minimum service level parameter.

11. A method as claimed in claim 10, wherein the at least one cell is the serving cell.

12. A method as claimed in claim 10, wherein adjusting the communications state of the apparatus with respect to its serving cell comprises ceasing communications with the communications network and performing the out-of-service procedure.

13. A method as claimed in claim 1, wherein the predetermined time parameter is received from the communications network.

14. A non-transitory computer-readable storage medium comprising a set of computer-readable instructions stored thereon, which, when executed by a processing system, cause the processing system to be configured with a first signal threshold and a second signal threshold, different from the first signal threshold, wherein the first signal threshold and the second signal threshold are calculated based on a reference signal,
in which the set of instructions, when executed by the processing system, further cause the processing system to perform the steps of:
monitoring a value of a signal transmitted from a base station in at least one cell in the communications network;
configuring a timer to be active, wherein the timer proceeds with counting, when the monitored signal value is determined to exceed the first signal threshold when the apparatus is determining whether or not to perform a cell reselection procedure;
configuring the timer to be inactive, wherein the timer ceases counting, when the monitored signal value is determined to exceed the first signal threshold when the apparatus is determining whether or not to perform an out-of-service procedure;
configuring the timer to be inactive when the monitored signal value is determined to be lower than the second signal threshold when the apparatus is determining whether or not to perform the cell reselection procedure;
configuring the timer to be active when the monitored signal value is determined to be lower than the second signal threshold when the apparatus is determining whether or not to perform the out-of-service procedure; and
responsive to a value of the timer satisfying a predetermined time parameter, adjusting the communications state of the apparatus with respect to its serving cell.

15. A non-transitory computer-readable storage medium as claimed in claim 14, wherein the first signal threshold is configured by adding a first predetermined parameter to a value of the reference signal and the second signal threshold is configured by subtracting a second predetermined parameter from the value of the reference signal.

16. A non-transitory computer-readable storage medium as claimed in claim 15, wherein the reference signal value is one of:

a ratio between a received energy per chip (Ec) of a common pilot channel (CPICH) associated with the serving cell divided by the total noise of the power density (No) of the CPICH associated with the serving cell; and
received signal code power (RSCP) of the common pilot channel (CPICH) associated with the serving cell.

17. An apparatus, comprising:
circuitry configured to:
  configure a first signal threshold and a second signal threshold, different from the first signal threshold, wherein the first signal threshold and the second signal threshold are calculated based on a reference signal;
  monitor a value of a signal transmitted from a base station in at least one cell in the communications network;
  configure a timer to be active, wherein the timer proceeds with counting, when the monitored signal value is determined to exceed the first signal threshold when the apparatus is determining whether or not to perform a cell reselection process;
  configure the timer to be inactive, wherein the timer ceases counting, when the monitored signal value is determined to exceed the first signal threshold when the apparatus is determining whether or not to perform an out-of-service procedure;
  configure the timer to be inactive when the monitored signal value is determined to be lower than the second signal threshold when the apparatus is determining whether or not to perform the cell reselection process;
  configure the timer to be active when the monitored signal value is determined to be lower than the second signal threshold when the apparatus is determining whether or not to perform the out-of-service procedure; and
  responsive to a value of the timer satisfying a predetermined time parameter, adjust the communications state of the apparatus with respect to its serving cell.

18. The apparatus as claimed in claim 17, wherein the apparatus is one of a user equipment, a mobile communications device and a computer.

19. A method as claimed in claim 1, wherein when the monitored signal value is determined to between the first signal threshold and the second signal threshold, a current state of the timer is maintained.

* * * * *